Figure 1:
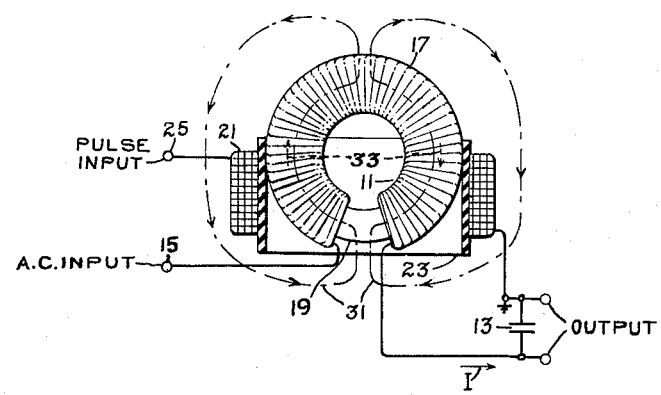

Nov. 8, 1955     C. F. SPITZER ET AL     2,723,353

NON-LINEAR RESONANT TRIGGER CIRCUITS

Filed May 29, 1953

Inventors:
Charles F. Spitzer,
Robert T. Gordon,
by Charles M. Hutchins
Their Attorney.

United States Patent Office 2,723,353
Patented Nov. 8, 1955

2,723,353
NON-LINEAR RESONANT TRIGGER CIRCUITS

Charles F. Spitzer, Syracuse, and Robert T. Gordon, Camillus, N. Y., assignors to General Electric Company, a corporation of New York Application May 29, 1953, Serial No. 358,402

6 Claims. (Cl. 307—88)

This invention relates to non-linear resonant trigger circuits of the type disclosed and claimed in a copending application of Charles F. Spitzer and Robert J. Reich, Serial No. 283,878, filed April 23, 1952, now Patent No. 2,653,254, dated September 11, 1953, and assigned to the same assignee as the present application. The present application is directed to new and useful improvements in such circuits.

As described in said copending application, a simple non-linear resonant trigger circuit comprises a series-circuit arrangement of a saturable core inductor of which the core may be of any suitable ferromagnetic material formed preferably to provide a closed magnetic loop, a capacitor, and a source of constant-frequency alternating current. In a preferred mode of operation, such a circuit can be triggered from a first stable state of high alternating current conduction to a second stable state of relatively low alternating current conduction by the application of voltage impulses to a trigger-voltage winding that is inductively coupled to the inductor of the above-described series-circuit arrangement. Circuits of the type described are known as ferroresonant flip-flops.

When triggered in the manner described, and especially when low-impedance pulse sources are employed, we have observed that tight coupling between the trigger winding and the inductor results in an undesired diminution of the ratio of the amplitude of the output signal derived when the circuit resides in the high-current state to the amplitude of the output signal derived when the circuit is in the low-current state. This ratio is indicative of the efficiency of operation of the circuit as a two-state or bistable-state device and is hereinafter referred to as the "on-off ratio." Reduction of the on-off ratio beyond an undesired predetermined value may render the circuit inoperative as a bistable-state device.

It is, therefore, a primary object of this invention generally to improve the art of non-linear resonant trigger circuits, and more specifically to provide new and improved arrangements for obviating the disadvantages mentioned hereinabove.

Another object of the invention is to provide a non-linear resonant trigger circuit that may be triggered by random or non-synchronous current or voltage pulses supplied from low-impedance sources and which operate with substantially no reduction of the on-off ratio.

Still another object of our invention is to provide a circuit permitting change from one stable state to another, upon application of like-polarity trigger pulses of random intervals.

Still another object of our invention resides in the provision of a non-linear resonant trigger circuit having a voltage pulse trigger winding so disposed relative the inductor element that substantially zero loading of the inductor element is experienced in the absence of a trigger pulse, whereby undesired reduction of the on-off ratio is substantially avoided.

Briefly stated, the objects of our invention may be realized through the provision of a triggering winding that is inductively coupled to the inductor of the non-linear resonant circuit in a manner such that very loose coupling therebetween is effected. In accordance with the present invention, the resonant circuit inductor is wound on a magnetic core, which may, if desired, be toroidally-shaped and the trigger winding is wound on any suitable form and disposed adjacent the core so that the flux of the trigger voltages passes through the core, the axis of the trigger winding being substantially perpendicular to that of the core. It is to be noted, however, that this particular orientation of the respective axes is not critical in regard to the orthogonality of the axes, the important factor being a spacial arrangement of these elements such that flux due to current in the trigger winding shall saturate the core of the inductor while at the same time insuring that flux due to current in the inductor shall not link the trigger winding. In this manner, loading of the inductor winding by the trigger winding is practically eliminated.

For additional objects and advantages, and for a better understanding of the invention, attention is now directed to the following description and accompanying drawing. The features of the invention which are believed to be novel are particularly pointed out in the appended claims.

Figure 2:
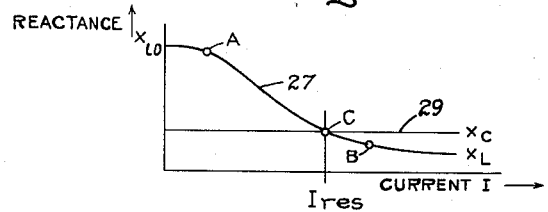
Figure 3:
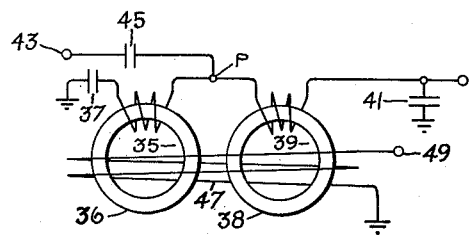

In the drawing,

Fig. 1 is an elevational view, partly in cross section and partly schematic, of a non-linear resonant trigger circuit constructed in accordance with the principles of this invention, Fig. 2 is a graph useful in explanation of the operation of the apparatus of Fig. 1, and Fig. 3 is a schematic diagram of a modification of the invention.

A single-branch series-resonant non-linear resonant circuit is shown in Fig. 1 and comprises a saturable-core inductor element generally indicated at 11 and a series-connected capacitor 13, the circuit being adapted for energization by any suitable source (not shown) of substantially constant-frequency constant-amplitude alternating current which may be connected at an input terminal 15. The inductor element 11, as shown, comprises a winding 17 that is wound on a core 19, which may be of toroidal shape and constituted of a suitable ferromagnetic material such as, for example, the class of low-loss magnetic materials generally known as ferrites.

A trigger winding 21 is wound on any suitable hollow tubular form 23 and is preferably disposed with a substantial part of the core 19 enclosed within the hollow bore portion of the form 23. A source of voltage impulses (not shown) may be connected to a pulse input terminal 25 which is, in turn, connected to one end of the winding 21, the other end of which is connected to the ground jointly with the grounded terminal of the capacitor 13. The output of the circuit may be derived across the capacitor 13, as shown, or it may be taken off the winding 17 as by a transformer output coupling arrangement, not shown. If desired, a load resistor can be connected in circuit with the winding 17 and capacitor 13, and the output can be derived across the resistor.

The operation of non-linear resonant trigger circuits is generally described in the aforementioned copending application of Spitzer and Reich and reference is hereby made to said copending application for a detailed explanation of a currently accepted theory. As applied to the circuit of Fig. 1 and referring to the graph of Fig. 2, which is a graph of the average or effective inductive reactance, $X_L$, of the inductor element 11, plotted as ordinates, as a function of the current, $I$, plotted as abscissas, it will be noted that the inductive reactance is not constant but is, instead, variable with the current according to a curve 27. The capacitive reactance, $X_C$, is invariant with respect to the current and is accordingly represented by the graph 29 parallel to the abscissas.

Assuming now that the circuit of Fig. 1 is initially in the low-current state at which the inductive reactance is relatively high, as indicated by the point A on the curve 27, the core 19 is unsaturated and the application of a trigger pulse of any polarity and of suitable amplitude and duration results in the establishment of a flux pattern of generally kidney shape, as shown in Fig. 1, by the dot-dash line 31. The flux due to the trigger pulse in winding 21 tends to saturate the core 19, and the value of the current thus rising to a magnitude such as indicated by the point B on curve 27 beyond the point of resonance C, the resonance point being that at which the effective inductive reactance of the core is equal to the capacitive reactance. At the termination of the pulse, the current in the circuit may tend to diminish and assume a value corresponding to that at resonance, the current value here being designated $I_{res}$ and which is of a magnitude sufficient to maintain a condition of core saturation even in the absence of a trigger pulse. This state corresponds to the high-current state of the circuit and is maintained until another pulse is applied at the input terminals 25.

To reset the circuit to the low-current high-inductive reactance state A, a pulse of either the same or opposite polarity as the former pulse can be employed. Now, considering at a given instant of time the flux in the core 19 due to the current $I_{res}$ to be clockwise, as indicated by the arrows 33 and the flux due to the trigger pulse to be clockwise in the left-hand portion of the core 19 and counterclockwise in the right-hand portion of the core, it will be seen that the flux contributions add in the left-hand portion and cancel in the right-hand portion. Inasmuch as the core is in a saturated condition, the addition of the flux contributions is ineffective to produce any change while the cancellation of the flux contributions operates to produce a net de-saturation of the core resulting in an increase in the inductive reactance thereof, which, in turn, causes an abrupt transition from the high-current state at C to the low-current state at A. It will thus be apparent that the circuit responds to successive pulses of like polarity to assume alternately the conduction states corresponding to points A and B. Similar reasoning will show that pulses of alternating polarity may equally well be used to change states.

In an operative embodiment using an alternating source at 250 kc., 25 volts and a pulse of 250 volt-microseconds operating into a coil of 0.9 millihenry, it was observed that the output developed across the series capacitor 13 was 106 volts in the on state and 7.8 volts in the off state, the wave shape being very nearly sinusoidal in both states. The specific values here stated are exemplary only and are not intended to be limiting in any manner.

A double-branch series circuit non-linear resonant trigger apparatus is illustrated in Fig. 3, comprising a first branch including a saturable core inductor element 35 and a series-connected capacitance 37 and a second branch connected in shunt with said first branch and including a similar saturable core inductor element 39 and a series-connected capacitance 41. The inductor elements 35 and 39 are provided, as before, with ferromagnetic cores 36 and 38, respectively, which may be of any suitable magnetic material such as, for example, ferrite or the like. The common terminal P of the windings of the inductor elements 35 and 39 is connected to an alternating-voltage input terminal 43 through a suitable impedance, here shown as a capacitance 45, although for some purposes an inductance or a pure resistance or a combination thereof may be employed in lieu of the capacitance. A trigger winding 47 is shown diagrammatically and, for the purpose of providing loose coupling as set forth hereinabove in the description of the apparatus of Fig. 1, the cores 36 and 38 of the inductor elements are disposed within the bore portion of a form (not shown) on which the trigger winding is wound.

As in the case of the single-branch series-circuit arrangement of Fig. 1, the disposition of the inductor cores 36 and 38 within the bore of the trigger winding facilitates the saturation of the cores by the flux due to the trigger pulses without permitting undesired loading of the inductor windings when no pulse is present, thus insuring a high on-off ratio.

The operation of the circuit of Fig. 3 is generally similar to that of Fig. 8 of the above-referenced copending application of Spitzer and Reich, and assuming that the left-hand branch is instantly in the high-current state and the right-hand branch is in the low-current state, the application at pulse input terminal 49 of a pulse from any suitable source tends to drive the left-hand branch into the low-current state and thus causes the voltage at point P to drop. The voltage drop causes the current in the left-hand branch to begin decreasing causing that branch to drop out of resonance. At the termination of the pulse, neither branch is either completely in resonance nor completely out of resonance and the voltage at P accordingly starts to rise. The rise in voltage at P causes one or the other of the branches to go toward resonance and since the right-hand branch is at that moment tending in the direction of resonance and the left-had branch is at that moment tending away from resonance, the cumulative or regenerative operation of the circuit drives the branches in their respective direction. Thus, the right-hand branch "flips" into resonance and the left-hand branch "flops" out. It has been observed that the flip-flop action occurs within a period of a few cycles of the working frequency.

The impedance of the capacitance 45 is selected to insure that only one of the branches can be in resonance at a time. It will be seen that if the branches should both tend to go into resonance simultaneously, the voltage at P would fall so low due to the additional drop in voltage across the impedance 45 that neither branch would have sufficient voltage to maintain it in resonance. Also, if both branches should tend, simultaneously, to drop away from resonance, the voltage at point P would rise above the critical value so that one or the other of the branches would snap into resonance.

While specific embodiments of our invention have been shown and described by way of example and illustration, it will of course be understood that various modifications may be made without departing from the principles of the invention. The appended claims are therefore intended to cover any such modification within the true spirit and scope of the invention.

What we claim as new and desire to secure by Letters Patent of the United States is:

1. A non-linear resonant circuit, comprising an inductor element in circuit with a capacitance, said inductor element comprising a saturable core and a winding thereon adapted for energization from a source of alternating potential, and a trigger-pulse winding adapted for energization from a source of trigger pulses, said trigger-pulse winding being supported exteriorly of said core and in a plane substantially perpendicular to the axis thereof.

2. A non-linear resonant circuit, comprising an inductor element and a capacitance connected in series therewith, said inductor element comprising a saturable core and a winding thereon adapted for energization from a source of alternating potential, and a trigger-pulse winding adapted for energization from a source of trigger pulses, said trigger-pulse winding being wound on a hollow cylindrical form and supported exteriorly of said core, the axes of said core and said cylindrical form being substantially at right angles to each other.

3. A bi-stable circuit, comprising a pair of shunt-connected non-linear resonant circuits each having an inductor element in circuit with a capacitance, said inductor elements comprising a saturable core of toroidal form and a winding thereon adapted for energization from a source of alternating potential, an impedance in series with said source, and a trigger-pulse winding adapted for energization from a source of trigger pulses, said trigger-pulse winding being supported exteriorly of the cores and in a plane substantially at right angles with the axes thereof.

4. A bi-stable circuit, comprising an alternating voltage input circuit, a pair of branch circuits connected across said input circuit, each said branch circuit comprising a non-linear resonant circuit including an inductor element in circuit with a capacitance, said inductor element comprising a saturable ferromagnetic core and a winding thereon adapted for energization from a source of alternating potential, and impedance in series with said source, and a trigger-pulse winding adapted for energization from a source of trigger pulses, said trigger-pulse winding being disposed around both said cores, whereby flux due to said trigger pulse winding selectively saturates said cores.

5. In combination, an alternating current circuit having a substantially constant voltage applied thereto, said circuit including ferroresonant circuit means dependent on the current therein for causing said circuit to assume one of a pair of stable states, and trigger means including a source of magnetomotive force physically embracing said ferroresonant circuit means and loosely coupled thereto for actuating said circuit to the other of said states without loading said resonant circuit in the absence of a pulse.

6. In combination, an alternating current circuit having a substantially constant voltage applied thereto, said circuit including resonant circuit means dependent on the current therein for causing said circuit to assume a first stable state of current conduction, and trigger means including a pulse-input winding coupled to said resonant circuit means for actuating said circuit to assume a second stable state of current conduction, said pulse-input winding comprising a multi-turn coil having a hollow bore portion and adapted to be disposed around said resonant circuit means in inductive coupling relation therewith, whereby loading of said resonant circuit is minimized.

References Cited in the file of this patent
UNITED STATES PATENTS
2,653,254     Spitzer et al. _____ Sept. 22, 1953